J. P. SCHMITZ.
Cesspool-Covers and Traps Combined.
No. 157,422.  Patented Dec. 1, 1874.
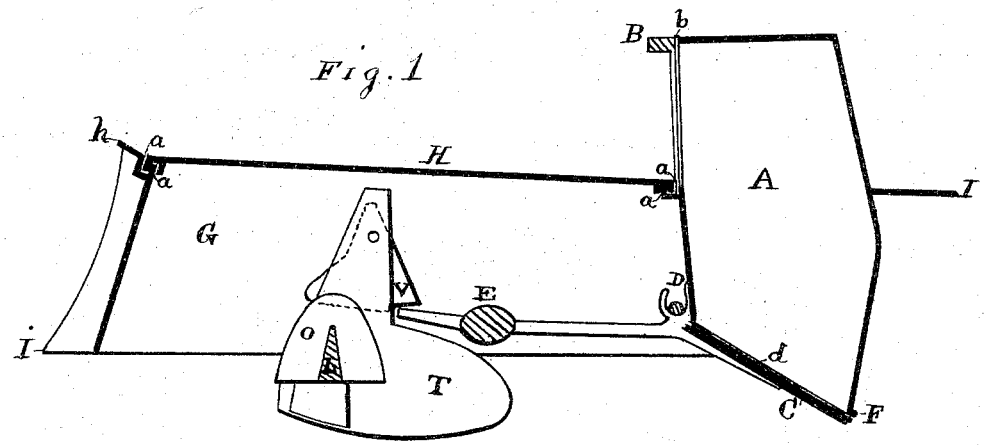
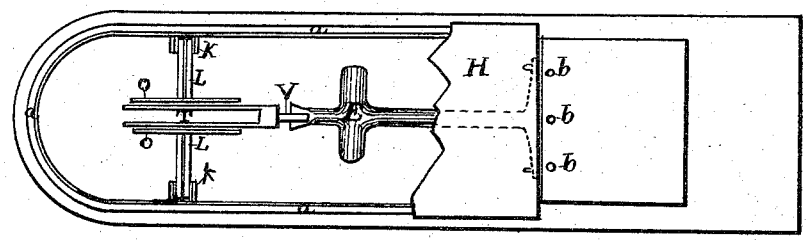
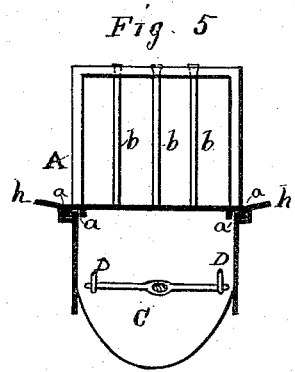
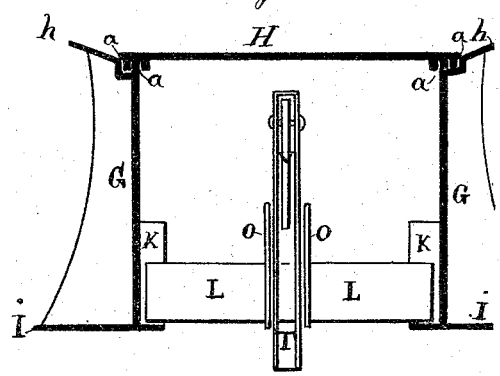
Witnesses:
Patrick Connolly
D. S. Hutchison
Inventor:
John Peter Schmitz

UNITED STATES PATENT OFFICE.

JOHN PETER SCHMITZ, OF SAN FRANCISCO, CALIFORNIA.

IMPROVEMENT IN CESS-POOL COVERS AND TRAPS COMBINED.

Specification forming part of Letters Patent No. 157,422, dated December 1, 1874; application filed September 19, 1874.

*To all whom it may concern:*

Be it known that I, JOHN PETER SCHMITZ, of the city and county of San Francisco and State of California, have invented a new and Improved Cess-Pool Cover and Trap Combined; and I do hereby declare that the following is a full, clear, and exact description of the same, reference being had to the accompanying drawing, forming a part of this specification, in which—

Figure 1 is a longitudinal section of the cess-pool cover and trap combined; Fig. 2, a horizontal section, Fig. 3 showing the inside of the frame endwise; Fig. 4, a horizontal view of the cover; Fig. 5, a horizontal view of the inside of trap and frame.

The object of my invention is an improvement in a combined trap and cover for cess-pools, to prevent foul odors from escaping from underground sewers into the open air. The improvement relates to features of construction and arrangement hereinafter described and claimed.

The frame or trap-case A, which is represented as being square on top, and having a projecting half-round front, B, may be of any other desired or suitable shape. The opening in front of case A is provided with iron rods *b*, placed through holes to form a strainer, to prevent large solid substances from passing into the trap. The removable smooth and elastic-lined flap C is hinged on hinge D, having a weight, E, whereby the flap is held up tight against the lower end of case A and projection F. The elastic lining *d*, fastened on smooth flap C, will insure a tight closing of the trap, the frame G forming, with cover H, tight-closing double grooves *a a*. The projection I on case A and on frame G rests on the wall which forms the cess-pool. The projection *h* on frame G is placed on a level with the street-pavement, the top of case A being placed on a level with the sidewalk. The removable snatcher and weight T are held in place by grooves K inside the frame G, and move on shaft L between two projections, O O. Inside of weight T is inserted snatcher V. The cover H has two rings, P, inserted, so that the same may easily be taken hold of when it requires removing.

My improvements in cess-pool covers and traps combined embrace the following elements in combination: The frame or trap-case A is arranged so as to be on a level with the sidewalk and curb-stones, resting with its rim I on the wall of the cess-pool, and its lower end being sloping and having a solid rim, F, whereon the smooth flap C, with its elastic lining *d*, forms a tight joint, when held up with weight E, the same being removable on hinge D. The trap-case has holes made on top, wherein iron rods *b b b* are placed to form a strainer; having also the projection B, by which the trap-case is made stronger, forming a half-round front.

This trap-case is an important improvement, forming not only a trap and part of the cess-pool cover, but also forming the corner-piece or curb for sidewalks cheaper and more applicable than those heretofore in use; also, having the most simple, reliable, and cheapest-inserted strainer.

The frame-case G, being connected with trap-case A, constitutes the cess-pool cover, and the same rests on the cess-pool wall with rim I. This frame or case G has the advantageous improvement of being oval or half-round on top, and square on its lower parts, having, therefore the advantage of placing the same on square-built cess-pools, which are considerably cheaper in construction and easier to repair than round ones; further, having the important improvement, with its double grooves *a a* tight-closing with the cover H, thereby rendering it far more reliably air-tight than other cess-pool covers heretofore in use, at the same time having on its inside ends the grooves K, wherein the shaft L is placed, on which the snatcher V and weight T move. This snatcher and weight is an additional power on flap C, and is the very means by which the traps are reliable, because, as soon as the trap-case A is filled to a certain amount with substances, then the flap is pressed downward, and after the weighted end of the flap slips up, and having passed snatcher V, then the substances in the trap have an overwhelming power on weight E, and the trap empties in a flash, and after so emptied the weight E has sufficient power to close the trap again until repeated.

A further advantage has my improvement.

In case the cess-pool or sewer fills up with sediment or dirt, and it be found necessary to clean the same out, then I disconnect or remove the cover H, the weight E, with flap C, and also snatcher and weight T. After the cleaning out is finished I replace the weights and cover.

What I claim is—

The combination of the elastic-lined flap C, the open bearing D, the weight E, snatcher V, and weight T, substantially as and for the purpose described.

JOHN PETER SCHMITZ. [L. S.]

Witnesses:
PATRICK CONNOLLY,
D. S. HUTCHISON.